United States Patent
Holling et al.

[11] Patent Number: 5,175,413
[45] Date of Patent: Dec. 29, 1992

[54] FAIL-SAFE RELAY DRIVE SYSTEM FOR COOKING APPARATUS

[75] Inventors: Ronald W. Holling; Robert R. Williams, both of Lincoln Township, Berrien County, Mich.; Bonifacio D. Malana, Evansville, Ind.

[73] Assignee: Whirlpool Corporation, Benton Harbor, Mich.

[21] Appl. No.: 560,448

[22] Filed: Jul. 31, 1990

[51] Int. Cl.$^5$ .............................................. H05B 1/02
[52] U.S. Cl. .................................. 219/519; 219/483; 219/497; 219/492; 219/508; 371/14; 361/101
[58] Field of Search ............... 219/506, 497, 519, 499, 219/501, 483, 492, 508; 371/14; 361/97-102

[56] References Cited

U.S. PATENT DOCUMENTS

| | | | |
|---|---|---|---|
| 2,807,010 | 9/1957 | Rowell | 340/213 |
| 2,807,011 | 9/1957 | Rowell | 340/213 |
| 3,288,195 | 11/1966 | Thomson | 158/28 |
| 3,569,793 | 3/1971 | Pinckaers | 317/123 |
| 4,245,148 | 1/1981 | Gisske et al. | 219/492 |
| 4,327,556 | 3/1982 | Zampini et al. | 62/155 |
| 4,338,650 | 7/1982 | Wierschke | 361/139 |
| 4,558,389 | 12/1985 | Black, Jr. et al. | 361/88 |
| 4,587,590 | 5/1986 | Bala et al. | 361/97 |
| 4,611,295 | 9/1986 | Fowler | 361/83 |
| 4,719,326 | 1/1988 | Yoo | 219/501 |
| 5,038,020 | 8/1991 | Kim | 219/501 |

Primary Examiner—Mark H. Paschall
Attorney, Agent, or Firm—Price, Heneveld, Cooper, DeWitt & Litton

[57] ABSTRACT

A fail-safe control system for operating a power relay to energize an electrical load such as a resistive heating element in a cooking apparatus includes first and second driving transistors connected in series with the control winding of the power relay and a source of power. A logic circuit, such as a microcomputer, produces pulses having specified characteristics at a single output port in order to energize the control winding. A circuit interconnecting the output port of the logic circuit with the driving transistors includes a first branch connected with the first transistor and a second branch connected with the second transistor. The first branch of the circuit includes an operational amplifier connected by a capacitor with the logic circuit output port in a manner that the first branch will drive the first transistor for a sufficiently long period of time initially in order to energize the relay control winding and cause the power relay to pull in. Thereafter, the first branch will only drive the first transistor if presented with pulses of much shorter duration; however, the shorter-duration pulses are capable of holding in the power relay. The second branch includes an operational amplifier connected directly with the logic circuit output port to apply all pulses produced at the output port to the second driving transistor.

33 Claims, 5 Drawing Sheets

FAIL-SAFE RELAY DRIVE SYSTEM FOR COOKING APPARATUS

BACKGROUND OF THE INVENTION

This invention relates generally to cooking appliances, and more particularly to relay-controlled cooking appliances, especially those which utilize electrical heating elements. More particularly, the invention relates to fail-safe electrical control systems for cooking appliances, and especially to those utilizing microcomputers as the controller, and which are adapted to ensure that the cooking appliance will not fail in a "runaway" mode that prevents the user from switching off the heating elements.

An ever-present danger associated with cooking appliances is a "runaway" failure, in which the control fails in a manner that prevents the user from turning off the heat source. This potential is particularly threatening with a cooking range having surface units because such surface units are exposed and, therefore, present a more imminent prospect of combustion or injury. Electronic controls for cooking appliances provide a significantly larger number of components than conventional electro-mechanical controls and present a greater number of failure modes. Microcomputers incorporated into such electronic controls are also subject to failure and typically fail with all output ports locked in one particular state.

While fail-safe controls have been proposed heretofore, prior attempts have had limited success. One such fail-safe control proposed in U.S. Pat. No. 4,719,326 to Yoo is intended to prevent power from being applied to the power relay of a cooking apparatus if a number of output ports of its controlling microcomputer fail in a common state. One problem with this type of control is that the interface circuitry occupies several output ports of the microcomputer, which are thus unavailable for other control functions other proposed fail-safe controls do not protect against single-component failure in the circuitry interfacing the microcomputer and the power relay.

SUMMARY OF THE INVENTION

The primary object of the present invention is to ensure that the power relay drive circuit for a cooking apparatus does not energize the surface units when there is a single component failure of the control system, including the microcomputer. It is a further object to provide such a fail-safe relay drive system through use of only one output port of the microcomputer.

According to one aspect, the invention is embodied in a control system for operating a power relay to energize an electrical heating element in a cooking apparatus, the control system having a logic circuit, such as a microcomputer, for outputting a signal at a single port thereof. First and second driving means are connected in series with the power relay and a source of power such that power is applied to the power relay only when both of the driving means are on. The control system includes means connected between the first driving means and the output port for producing a biasing signal for turning on the first driving means only when a pulsed signal is present at the output port. The control system further includes second means connected between the second driving means and the output port for producing a biasing signal for turning on the second driving means only when a signal is present at the output port.

Another aspect of the invention is embodied in a control system for operating a power relay to energize an electrical heating element in a cooking apparatus, wherein the control system has a logic circuit with an output port and logic means for switching the output port between first and second logic states. The output port is switched from a first state to a second state for a first period of time and thereafter is repetitively switched to the second state for second predetermined periods that are shorter than the first period. The control system further includes a drive circuit connecting the output port of the microcomputer with the power relay which operates to apply power to the power relay when the output port is in the second state. The drive circuit includes means for removing power from the power relay after the output port has been in the second state for a third period of time that is greater than the first period. In order to allow the control system to pull in the power relay during the first period, the means for removing power is inoperative during this period. The second period of time is sufficiently long to keep the power relay held in once it has been pulled in.

Although the invention is especially beneficial in the control of the surface units of a cooking range, it is also effective in other such applications, for example in the control of other cooking appliances such as ovens, including microwave ovens, and in a broader sense is not necessarily limited to use in a cooking apparatus. Further, while particularly contemplated for use in connection with electrical heating elements, the invention is not necessarily limited to that particular application. The objects, advantages and features of the invention will become more apparent upon review of the following specification in conjunction with the drawings.

DESCRIPTION OF THE PREFERRED EMBODIMENT

Figure 1:
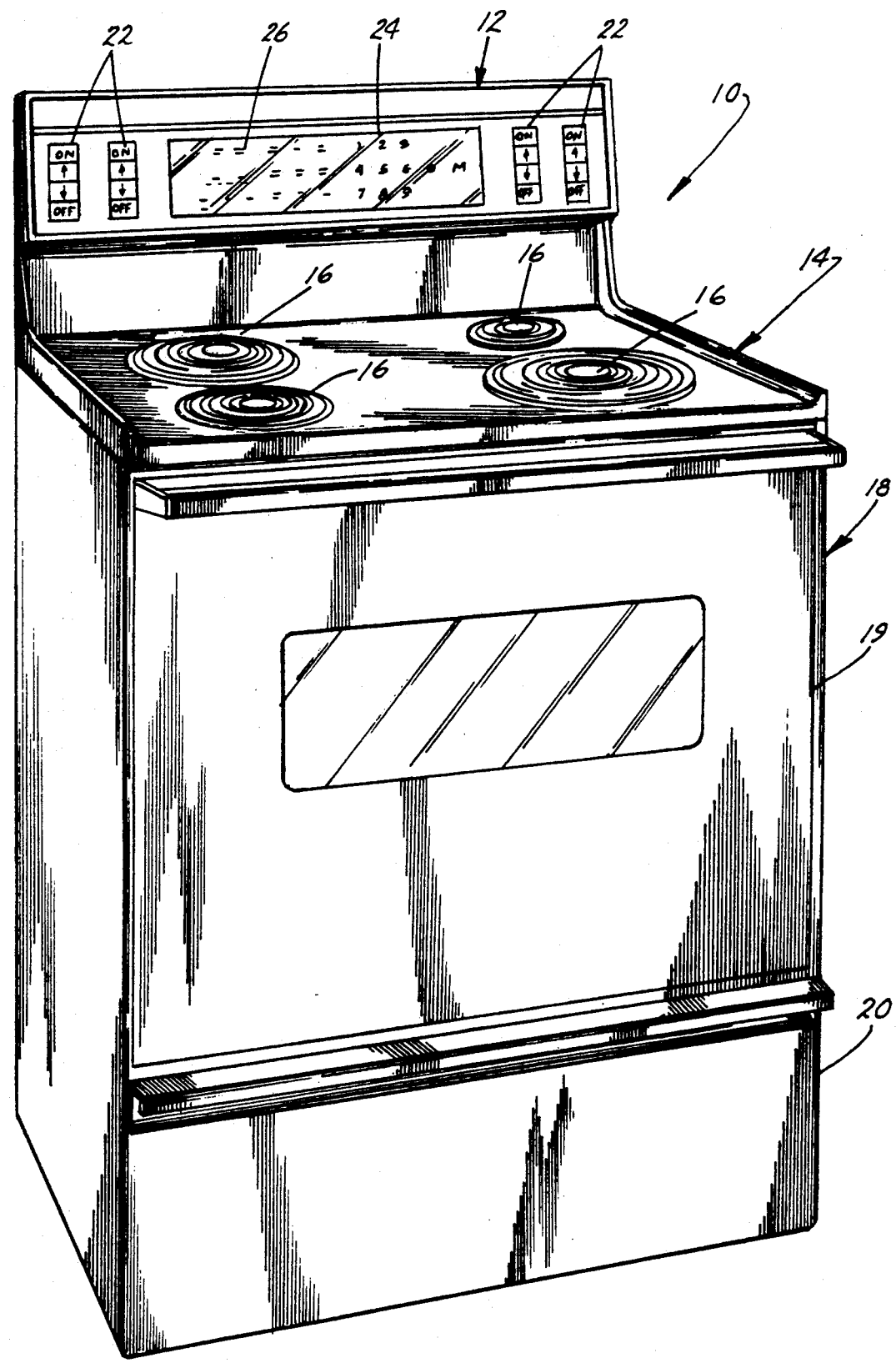
FIG. 1 is a frontal perspective view of an exemplary cooking apparatus embodying the present invention.

Referring now in more detail to the drawings, and the illustrative embodiments depicted therein, a cooking apparatus illustrated generally at 10 in FIG. 1 includes a control console 12 mounted upon a cabinet 14. Cabinet 14 additionally supports a plurality of surface units 16 on a horizontal surface. Surface units 16 are, in this particular embodiment, electrical resistance heating elements which produce heat by the application of electrical power to their terminals. Cabinet 14 additionally includes a baking oven 18, which is accessed through an oven door 19. One or more heating elements (not shown) are positioned within oven 18 in order to elevate the temperature of the oven. Cooking apparatus 10 may additionally include a utility drawer 20 and various other accessories.

Figure 2:
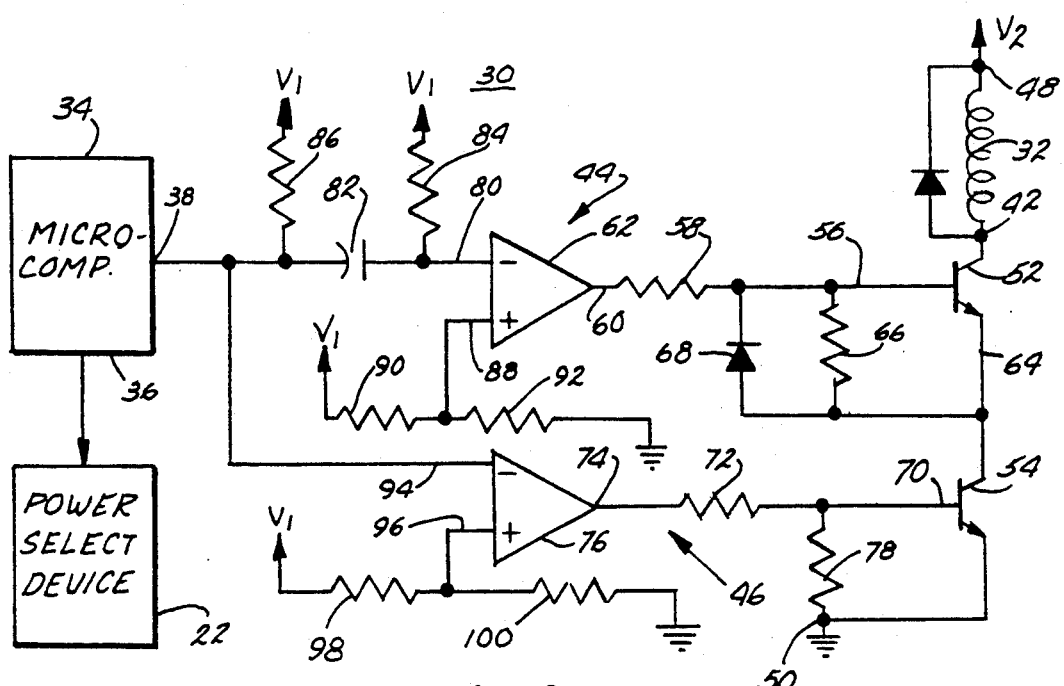
FIG. 2 is a schematic diagram of a fail-safe relay drive system according to the present invention.

Control console 12 includes selection devices 22 for receiving a user command to selectively operate the surface units 16, as well as a selection device 24 for receiving user inputs to operate oven 18. Control console 12 may additionally include an indicator board 26 for displaying the selections made by the user and the operational status of surface units 16 and oven 18. Selection devices 22 and 24, in the illustrated embodiment, are position-sensitive impedance devices which respond to the relative position at which a user presses a particular selection device 22 (FIG. 2). A control system 30 (FIG. 2), which is typically housed within console 12, interprets the analog voltage produced by selection devices 22 and responds by actuating a power relay 32 associated with a selected one of the surface units 16 according to the duty cycle corresponding to the selected power level. In the illustrated embodiment, a 30-second time base is selected for control of the duty cycle. The contacts (not shown) of relay 32 are in series with the associated surface unit 16 between AC power lines connected to the cooking apparatus 10. When control voltage is applied across relay coil 32, its corresponding contacts close to apply the AC power to the associated surface unit, to thereby produce heat for cooking.

Control system 30 includes a microcomputer 34 having a plurality of input ports 36, only one of which is illustrated, and a plurality of output ports 38, only one of which is illustrated. Input port 36 receives an analog or digital voltage from power selection device 22, which corresponds to the selected power level for a particular surface unit. Microcomputer 34 interprets the combination of inputs received from the user according to its control programming and responds by providing the necessary output signal on output port 38 to energize power relay 32 according to an appropriate duty cycle.

The illustrated coil of relay 32 includes a first terminal 48 connected with control voltage source $V_2$ and a second terminal 42. Terminal 42 is connected to signal ground 50 through a series circuit which includes the emitter-collector junctions of a first driving means, such as a transistor 52, and a second driving means, such as a transistor 54. A first circuit branch, generally shown at 44, interconnects output port 38 with base 56 of first switching transistor 52. A second circuit branch, generally shown at 46, is connected essentially in parallel with circuit branch 44 and extends between output port 38 and base 70 of second switching transistor 54. In this manner, when both transistors 52 and 54 are conducting, voltage $V_2$ is applied across the coil of relay 32, and when either transistor 52 or 54 is not conducting, the coil of relay 32 is deenergized. In order for both transistors 52 and 54 to be conducting, both branch circuits 44 and 46 must be supplying biasing voltage to the base of their associated driving transistor.

Base 56 of transistor 52 is connected through a series resistor 58 to the output 60 of a first operational amplifier, or op-amp, 62. Base 56 is additionally connected to the junction 64 with transistor 54, by a resistor 66 in parallel with a diode 68. The base 70 of transistor 54 is connected through a series resistor 72 to the output 74 of a second op-amp 76. Base 70 is also connected with signal ground 50 through a resistor 78. When outputs 60 and 74 are both at a high, or positive voltage level, transistors 52 and 54 are both conducting, thereby energizing relay 32. When either output 60, 74 is low (i.e., at signal ground voltage) for a sufficient period of time, the circuit between control input terminal 48 and ground 50 is broken, which deenergizes the coil of relay 32, causing the relay to drop out. The purpose of diode 68 is to prevent damaging reverse high voltage from being applied across the base-to-emitter junction of transistor 52 in the event transistor 54 is turned off before transistor 52.

The inverting input 80 of op-amp 62 is connected to output port 38 of microcomputer 34 through a series capacitor 82, and inverting input 80 is connected with a voltage source $V_1$ through a resistor 84. A non-inverting input 88 of op-amp 62 is held at a constant voltage level by a voltage divider defined by resistors 90 and 92 connected in series between voltage source $V_1$ and signal ground. The inverting input 94 of second op-amp 76 is connected directly with open-drain output port 38 of microcomputer 34 and is coupled to voltage source $V_1$ through pull-up resistor 86. A non-inverting input 96 of op-amp 76 is maintained at a constant voltage by a voltage divider defined by resistors 98 and 100, which are connected in series between voltage source $V_1$ and signal ground.

Figure 8:
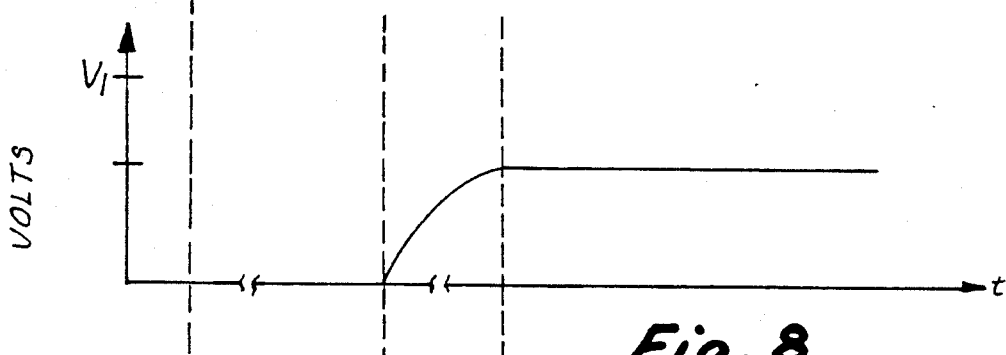
FIG. 8 is a waveform diagram of the voltage across the capacitor utilized in practicing the invention.
Figure 9:
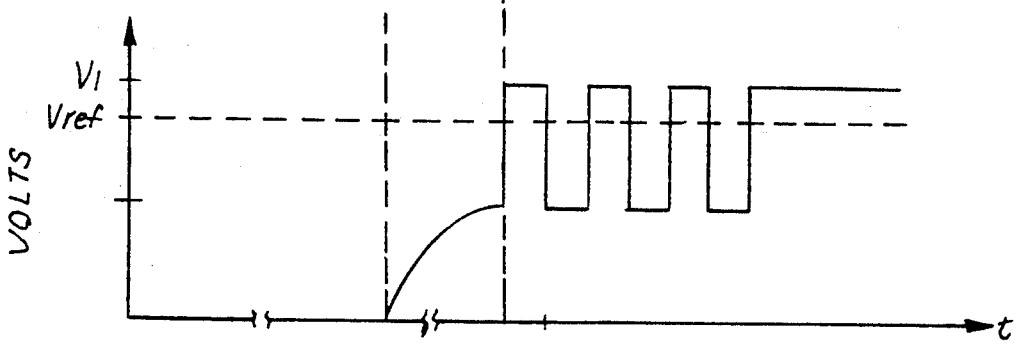
FIG. 9 is a waveform diagram of the input voltage to one comparison device utilized in practicing the invention.
Figure 10:
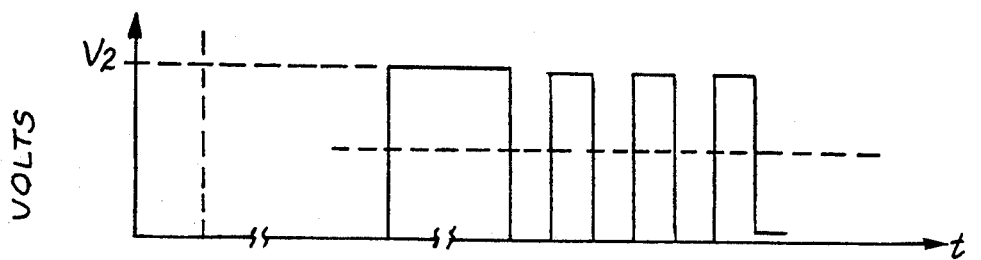
FIG. 10 is a waveform diagram of the voltage across the power relay utilized in practicing the invention.

Operation of control system 30 is illustrated by reference to FIGS. 7-10. When the control program of microcomputer 34 determines that relay 32 is to be energized, open-drain output port 38 is held in a high state by pull-up resistor 86 during an initial period A. With output port 38 at a positive voltage, capacitor 82 will discharge through resistors 86 and 84 to supply voltage $V_1$. The length of period A is selected to be sufficiently long to allow capacitor 82 to be fully discharged and, in the illustrated embodiment, is preselected to be 800 milliseconds. At the conclusion of period A, output port 38 is switched low to signal ground level during period B. Because capacitor 82 is discharged, the switching of output port 38 to signal ground pulls inverting input 80 of op-amp 62 to signal ground (FIG. 9), which causes output 60 of the op-amp to switch to a positive state, turning on transistor 52 (FIG. 8). The low voltage state on output port 38 during period B additionally causes the inverting input 94 of op-amp 76 to be at a lower level than its non-inverting input 96, which switches output 74 to a positive level, turning on transistor 54. With transistors 52 and 54 both conducting, relay 32 is pulled in (FIG. 10). During period B, capacitor 82 begins to charge, as illustrated in FIG. 8. As the voltage across capacitor 82 rises, the voltage applied to inverting input 80 of op-amp 62 increases, as seen in FIG. 9. The duration of period B is pre-established to prevent capacitor 82 from fully charging and to allow relay 32 to pull in at full voltage $V_2$. This duration is 80 milliseconds in the illustrated embodiment.

Figure 7:
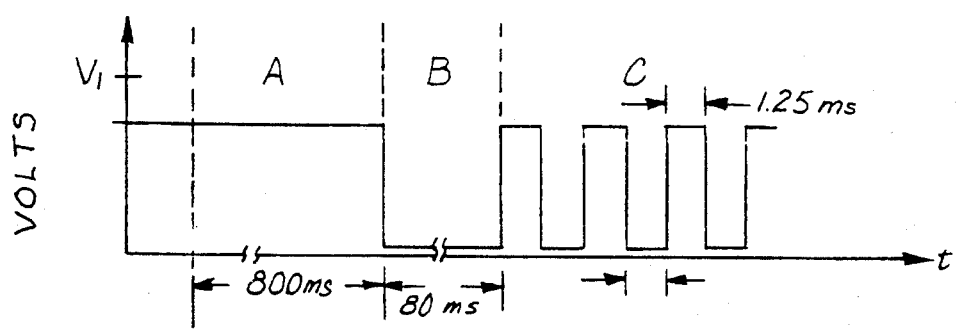
FIG. 7 is a waveform diagram of the output voltage of a microcomputer utilized in practicing the invention.

At the end of period B, output 38 of microcomputer 34 is repetitively switched between high and low states to produce a squarewave, as seen in FIG. 7. Because the time-constant of capacitor 82 and resistor 84 is much greater than the illustrated 1.25 millisecond pulse repetition rate of the squarewave produced on output port 38 during period C, capacitor 82 charges or discharges to maintain a voltage of approximately 0.5 $V_1$ during this period. Therefore, during period C, capacitor 82 acts like a battery in series between output port 38 and inverting input 80, thereby providing the waveform illustrated in FIG. 9 to input 80 of op-amp 62. Because the excursions of the voltage on inverting input 80 are above and below Vref, the preset level of non-inverting input 88 during period C, output 60 of op-amp 62 toggles between high and low levels during this period. Likewise, as microcomputer output port 38 alternates between high and low levels, output 74 of op-amp 76 toggles between high and low levels in unison with the output of op-amp 62. The result is that, during period C, transistors 52 and 54 switch off and on according to an approximate 50% duty cycle, thereby applying an average voltage to the coil of relay 32 equal to one-half of $V_2$ during period C. This voltage is sufficient to hold in relay 32 while using minimum amounts of power.

Control system 30 is fail-safe in that the failure of any one component, including microcomputer 34, will not result in relay 32 being left permanently energized. If, for example, op-amp 62 fails with its output 60 in a low state, transistor 52 will not operate and relay 32 will not pull in. If output 60 goes permanently high, transistor 52 will conduct continuously but control of relay 32 will be dependent upon the performance of transistor 54. Likewise, if one of transistors 52 and 54 fails either open or shorted, the result will be either that relay 32 will be permanently deenergized or will be under the control of the other transistor 52, 54. If output port 38 of microprocessor 34 fails in a low state, capacitor 82 will charge through resistor 84, pulling inverting input 80 sufficiently high to switch output 60 of op-amp 62 to a low state, switching transistor 52 into a permanent "off" condition. If output port 38 of microcomputer 34 fails in a high state, both inverting inputs 80 and 94 of op-amps 60 and 76, respectively, will be at a higher level than their respective non-inverting inputs 88, 96, so that both transistors 52 and 53 will be switched off. Because op-amps 62, 76 supply current, rather than sink current through a pull-up resistor as done by comparators, control system 30 has the additional fail-safe feature that either transistor 52, 54 will not be driven if its respective op-amp fails or is not properly inserted on the circuit board. This schedule of possible conditions is illustrative only, and further analysis will show the absence of any single point failure mode for control system 30.

Figure 3:
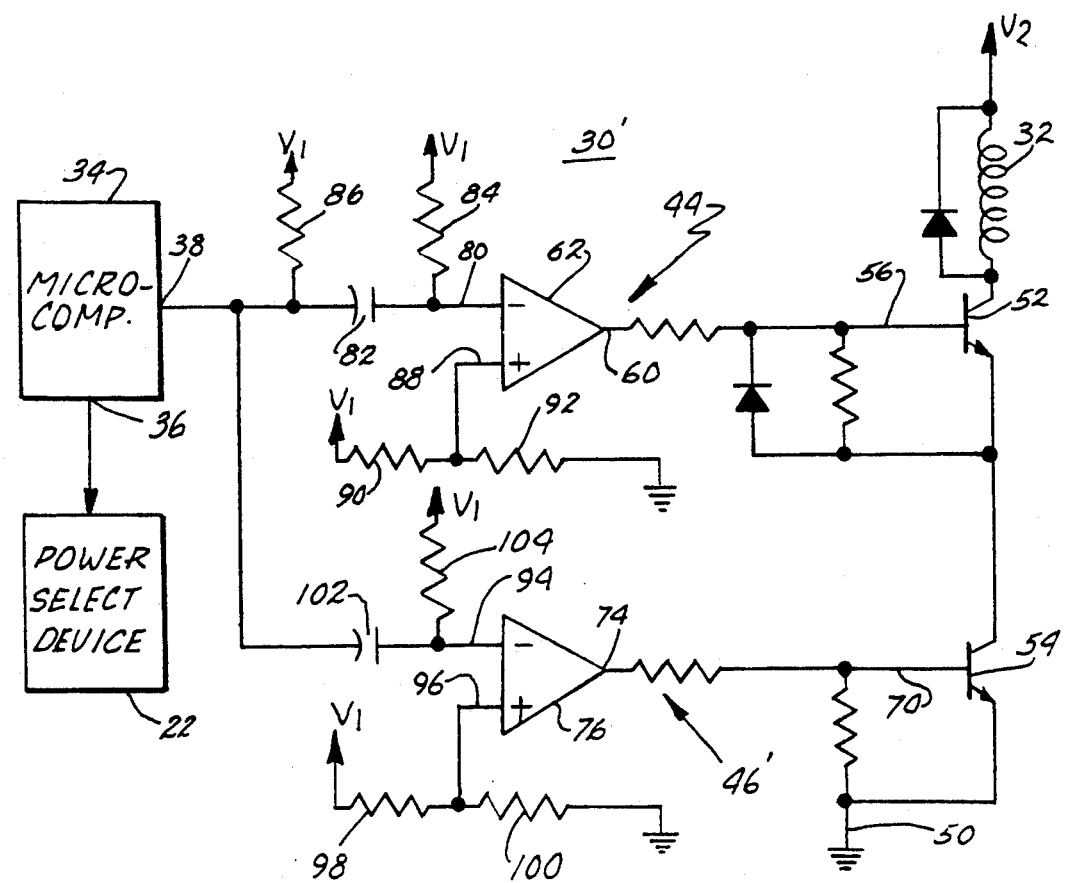
FIG. 3 is a first alternative embodiment of a fail-safe relay drive system.

In the alternative embodiment 30' of the present control system, illustrated in FIG. 3, the second control channel, designated 46', includes a capacitor 102 in series between inverting input 94 of op-amp 76 and output port 38 of microcomputer 34. In addition, a resistor 104 connects inverting input 94 with voltage source $V_1$. The system 30' of FIG. 3 functions in the same manner as system 30 of FIG. 2 except that, if output port 38 of microcomputer 34 fails in a low state, capacitor 102 will charge, causing inverting input 94 to increase until it is at a higher level than non-inverting input 96, at which time output 74 of op-amp 76 will switch low, turning off transistor 54. Thus, in this failure mode for microcomputer 34, both transistors 52 and 54 are deenergized to provide further assurance of a fail-safe condition.

Figure 4:
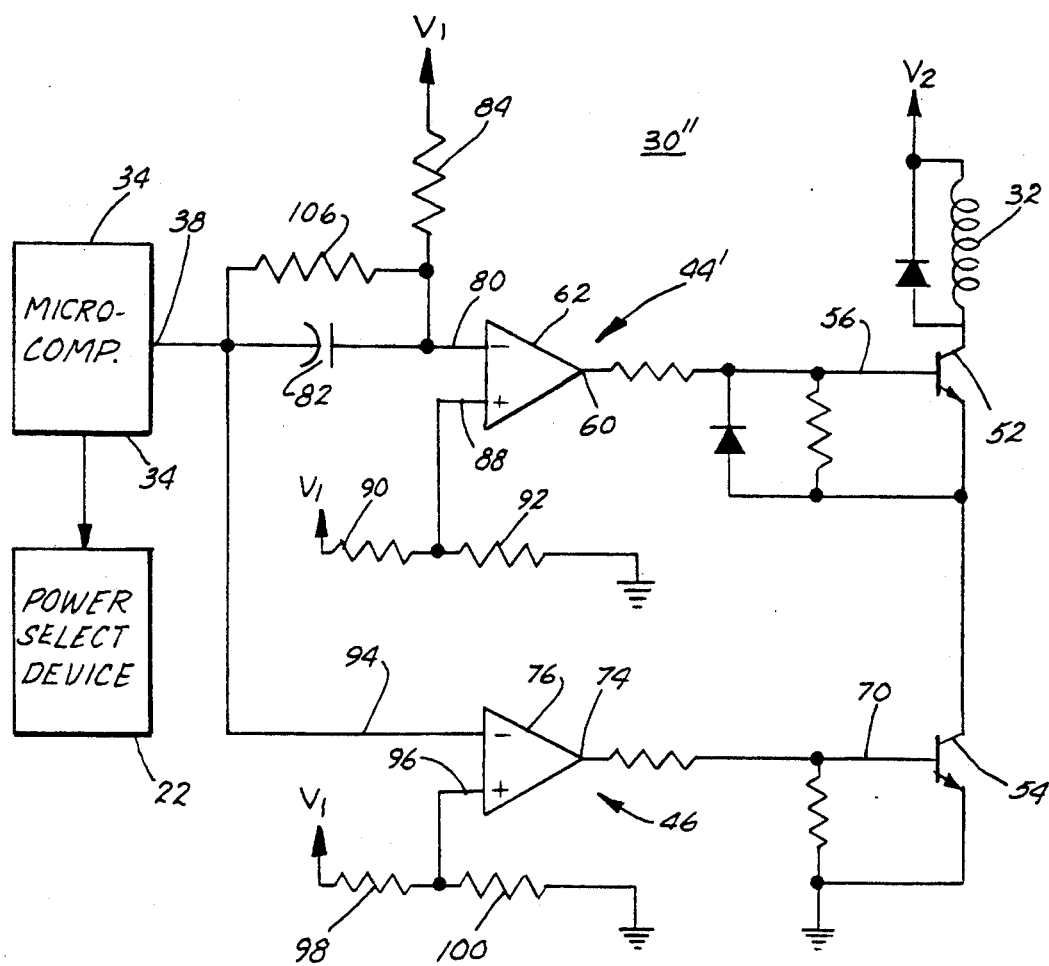
FIG. 4 is a second alternative embodiment of a fail-safe relay drive system.

In a second alternative embodiment, illustrated in FIG. 4 and designated by the numeral 30'', resistor 86 is replaced with a resistor 106 connected in parallel with capacitor 82. Control system 30'' functions in substantially the same manner as control system 30 of FIG. 2 except that capacitor 82 is discharged through resistor 106 when output port 38 is at a high level.

Figure 5:
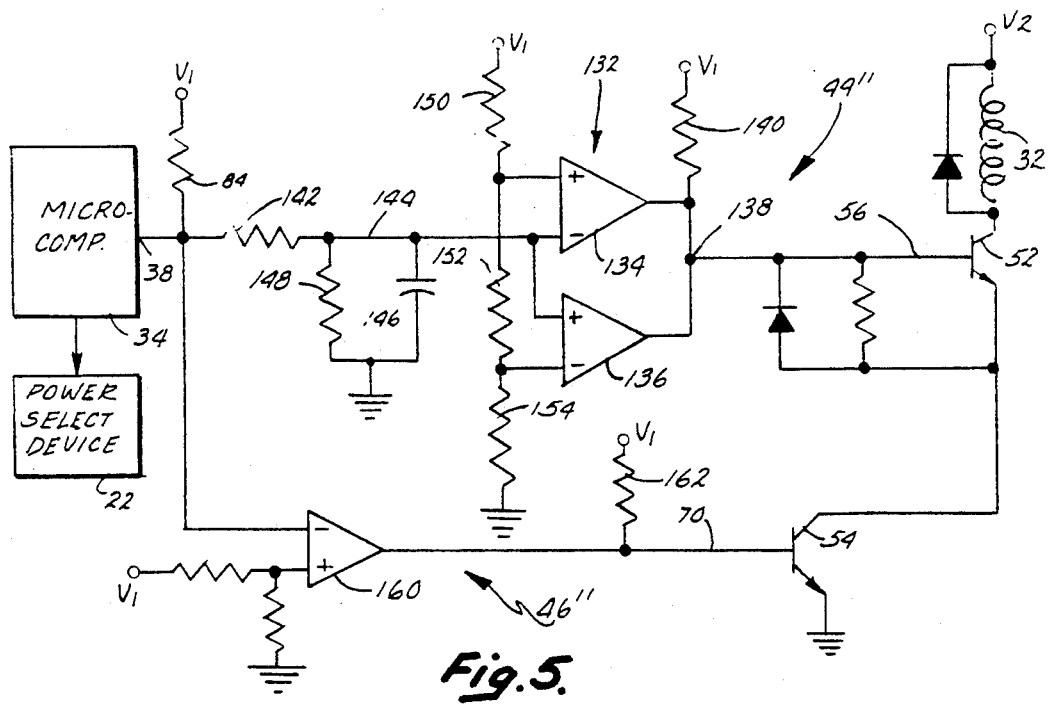
FIG. 5 is a third alternative embodiment of a fail-safe relay drive system.

In a third alternative embodiment illustrated in FIG. 5, a control circuit 130 includes a first control channel 44'' having a window comparator 132 defined by a pair of comparators 134 and 136 who have their outputs combined at 138 and connected through a pull-up resistor 140 to $V_1$. Output port 38 of the microcomputer is connected through a series resistor 142 to a junction 144 joining the inverting input of comparator 134 and the non-inverting input of comparator 136. A capacitor 146 and parallel resistor 148 are connected from junction 144 to signal ground. The inverting input of comparator 136 is held at a constant level by a voltage divider defined by series connected resistors 150, 152 and 154. The non-inverting input of comparator 134 is held at a high constant level by the same voltage divider.

A second control channel 46'' includes a comparator 160 having its inverting input connected with output port 38, its output connected with a pull-up resistor 162 and base and its non-inverting input connected with a voltage divider defined by resistors 164 and 166 in series between $V_1$ and signal ground.

Control circuit 130 responds to the same output signal on port 38 except that capacitor 146 is first charged and then partially discharged to a level that is between the reference voltages of comparators 134 and 136. As long as a squarewave signal is provided during period C (FIG. 7), the voltage at node 144 will stay between these reference voltages. As a result, output 138 will stay positive and transistor 52 will stay fully driven. However, transistor 54 will switch according to the squarewave as in previously-described embodiments. While control circuit 130 is capable of protecting against single-component failures, it is not useful as with synchronized line switching schemes because the pull-in and drop-out point cannot be closely controlled as with previously-described embodiments.

Figure 6:
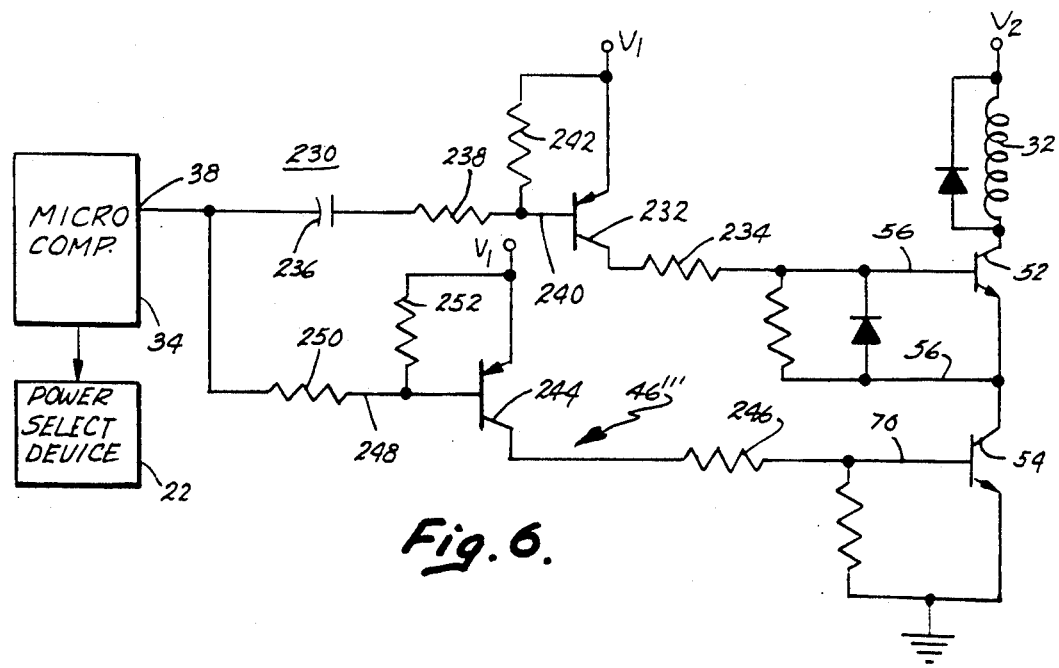
FIG. 6 is a fourth alternative embodiment of a fail-safe relay drive system.

In a fourth alternative embodiment, illustrated in FIG. 6, a control circuit 230 includes a first control channel 44''' having a PNP transistor 232 connected with its emitter tied to $V_1$ and its collector connected through a resistor 234 to base 56 of transistor 52. A capacitor 236 is connected with output port 38 and in series with a resistor 238 to the base 240 of transistor 232. A resistor 242 is connected between base 240 and $V_1$. A second control channel 46''' includes a second PNP transistor 244 having its emitter connected with $V_1$ and its collector connected through a resistor 246 to base 70 of transistor 54. The base 248 of transistor 244 is connected through a resistor 250 to output port 38 and through a resistor 252 to $V_1$.

Control circuit 230 functions in essentially the same manner as control circuit 30 except that the function performed by resistor 86 is performed by the series combination of resistors 250 and 252. Also, instead of using op-amps, each having a pair of inputs connected with a reference voltage and with the signal to be processed, control circuit 230 uses transistors biased by an emitter to base resistor.

In addition to the enhanced safety provisions provided by the invention set forth in the illustrated embodiments, the power requirement for the control system in accordance herewith is significantly reduced. That is, each power relay 32 is held in at a voltage level that is approximately one-half of the pull-in voltage. Because there are a plurality of surface units 16 (typically, four) and each one is energized by a separate power relay 32, the power saving is multiplied accordingly. Although the invention is illustrated as embodied in a control for surface units in a cooking apparatus, its principles would also apply to other control systems, for example that which is used for the heating elements in oven 18. The present invention could also have application to other cooking apparatus, such as microwave ovens, induction ranges, and the like. Furthermore, although the present invention is illustrated in a control utilizing a microprocessor, its principles could also be applied to other digital logic controls.

Other changes and modifications in the specifically described embodiments can be carried out without departing from the principles of the invention, which is intended to be limited only by the scope of the appended claims, as interpreted according to the principles of patent law, including the doctrine of equivalents.

The embodiments of the invention in which an exclusive property or privilege is claimed are defined as follows.

1. A fail-safe control system for operating a power relay to energize an electrical load in a cooking apparatus, said control system comprising:
   logic circuit means for outputting a signal at a single port thereof;
   first and second driving means connecting in series with a control winding of a power relay and a source of power, said driving means being switchable between an on state and an off state such that power from said source is applied to said power relay control winding only when both of said driving means are in said on state;
   first switching means connected between said first driving means and said port for producing a first biasing signal to turn on said first driving means only when a pulsed signal is present at said port;
   second switching means connected between said second driving means and said port for producing a second biasing signal to turn on said second driving means only when a signal is present at said port.

2. The fail-safe control system of claim 1 wherein said first switching means includes circuit means for producing said first biasing signal in response to a signal that is greater than a predetermined level, energy storage means connecting said first switching means to said port and discharge means for discharging said energy storage means at a rate which prevents said circuit means from producing said first biasing signal when said port is producing a pulsed signal at less than said predetermined repetition rate.

3. The fail-safe control system of claim 2 wherein said energy storage means includes a capacitor connected in series with said input.

4. The fail-safe control system of claim 3 wherein said circuit means includes a operational amplifier having a reference voltage applied to an input thereof and said signal greater than a predetermined level applied to another input thereof, such that said op-amp will produce said first biasing signal in response to a predetermined relationship between signal levels being applied to said inputs.

5. The fail-safe control system of claim 3 wherein said discharge means includes a resistor connected between said first switching means and a reference voltage.

6. The fail-safe control system of claim 3 wherein said discharge means includes a resistor connected in parallel with said capacitor.

7. The fail-safe control system of claim 1 wherein said second switching means includes circuit means for producing said second biasing signal in response to a signal that is greater than a predetermined level.

8. The fail-safe control system of claim 7 wherein said circuit means includes a operational amplifier having a reference voltage applied to an input thereof and said signal greater than a predetermined level applied to another input thereof, such that said op-amp will produce said second biasing signal in response to a predetermined relationship between voltage levels being applied to said inputs.

9. The fail-safe control system of claim 1 wherein said first switching means is responsive to a pulsed signal at said port only when said pulsed signal has a repetition rate greater than a predetermined rate.

10. The fail-safe control system of claim 1 wherein said second switching means is only responsive to a pulsed signal being present at said port.

11. The fail-safe control system of claim 10 wherein said second switching means is responsive to a pulsed signal at said port only when said pulsed signal has a repetition rate greater than a predetermined rate.

12. The fail-safe control system of claim 11 wherein said second switching means includes circuit means for producing said second biasing signal in response to a signal being presented to an input thereof that is greater than a predetermined level, energy storage means connecting said input to said port and discharge means for discharging said energy storage means at a rate that will prevent said circuit means from producing said second biasing signal when said port outputs a signal that is not pulsed at a rate at least as great as said predetermined repetition rate.

13. The fail-safe control system of claim 12 wherein said first switching means includes another circuit means for producing said first biasing signal in response to a signal being presented to an input thereof that is greater than another predetermined level, another energy storage means connecting said input of said another circuit means to said port and another discharge means for discharging said another energy storage means at a rate that will prevent said another circuit means from producing said first biasing signal when said port outputting a signal that is not pulsed at a rate at least as great as said predetermined repetition rate.

14. The fail-safe control system of claim 1 wherein said logic circuit means comprises a programmed microcomputer.

15. A fail-safe control system for operating a power switching device to control a heating element in a cooking appliance, said control system comprising:
   logic circuit means having an output port and logic means for switching said output port between first and second logic states, wherein said logic means is adapted to switch said output port from a first state to a second state for a predetermined first period of time and thereafter repetitively switch said output port from said first to said second state for a predetermined second period of time that is less than said first period of time;
   drive circuit means connecting said output port with a power switching device for applying power to said power switching device in response to said output port being in said second logic state and for removing power from said power switching device after power has been applied thereto longer than a third predetermined period of time that is less than said first period of time; and means for maintaining said drive circuit means in a state applying power to said power switching device during said first period of time in order to ensure that such power is applied to said power switching means for a sufficient period of time to operate the latter.

16. The fail-safe control system of claim 15 wherein said logic circuit means comprises a microcomputer.

17. The fail-safe control system of claim 15 wherein said drive circuit means includes first and second driving means connected in series with said power switching device and a power source, each of said driving means being switchable between a conducting and a non-conducting state such that actuating power can be applied to said power switching device only when both of said driving means are conducting.

18. The fail-safe control system of claim 17 wherein said drive circuit means further includes first and second branch circuits, said first branch circuit being connected between said output port and said first driving means and said second branch circuit being connected between said output port and said second driving means.

19. The fail-safe control system of claim 18 wherein each of said branch circuits includes means for switching its associated driving means to a conducting state in response to said output port being in said second state and wherein at least one of said branch circuit includes means for switching its associated driving means to a non-conducting state in response to said output port being in said second state for a period greater than said third period of time.

20. A fail-safe control system for operating a power relay to energize an electrical load in a cooking apparatus, said control system comprising:

first and second driving means connected in series with said power relay and a source of power, each of said driving means being switchable between an on state and an off state for electrically connecting said power relay with said source of power only when both of said driving means are in said on state;

logic circuit means having a port adapted to produce first and second signal levels;

a first branch circuit connecting said port with said first driving means, said first branch circuit including a first comparison means for producing a first biasing signal to turn on said first driving means when a signal is presented to an input of said first comparison means which has a given relationship to a first predetermined level, and a capacitor connected between said port and said input of said first comparison means;

a second branch circuit connecting said port with said second driving means, said second branch circuit including a second comparison means for producing a second biasing signal to turn on said second driving means when a signal is presented to an input of said second comparison means which has a given relationship to a second predetermined level, and means for connecting said port with said input of said second comparison means; and said logic circuit means including means for producing said first signal level for a predetermined first period of time that is sufficient to establish a given charge condition on said capacitor and for producing said second signal level for a predetermined second period of time after said first period of time.

21. The fail safe control system in claim 20 wherein said second signal level is sufficient to establish a said given relationship to a first predetermined level at said input of said first comparison means and to establish said given relationship to a second predetermined level at said input of said second comparison means.

22. The fail safe control system in claim 21 wherein said second period of time is of a sufficient duration to enable said driving means to initially operate said relay and of sufficient duration for said second signal level to establish different charge on said capacitor.

23. The fail safe control system in claim 22 wherein said logic circuit means further includes means for alternatingly producing said first and second signal levels during a third period after said first and second periods, said first and second signal levels being alternatingly produced during said third period at a repetition rate that is sufficient to maintain said different charge on said capacitor and to maintain operation of said relay by said driving means.

24. The fail-safe control system of claim 20 wherein said means for connecting said port with said input of said second comparison means includes a second capacitor.

25. The fail-safe control system of claim 20 wherein said first comparison means includes a first operational amplifier having another input connected with a first reference voltage to establish said first predetermined level.

26. The fail-safe control system of claim 25 wherein said second comparison means includes a second operational amplifier having another input connected with a second reference voltage to establish said second predetermined level.

27. The fail-safe control system of claim 20 wherein said second comparison means includes a second operational amplifier having another input connected with a second reference voltage to establish said second predetermined level.

28. The fail-safe control system of claim 20 wherein said logic circuit comprises a programmed microcomputer.

29. A fail-safe control system for energizing a control winding of a power relay to thereby actuate a heating element in a cooking apparatus, said control system comprising:

a microcomputer programmed to produce a signal on a selected output port;

first and second transistors having emitter-collector junctions connected in series with each other, with a control winding of a power relay, and with a source of power; each of said transistor emitter-collector junctions being switchable between a conducting state and a non-conducting state in response to a bias signal applied to a base of said transistor;

a first branch circuit connecting said port with said base of said first transistor, said first branch circuit including a first operational amplifier having first and second inputs and an output, said first branch circuit further including a capacitor connected between said first input and said port, a first reference voltage connected with said second input and means for connecting said output to said base of said first transistor, said first operational amplifier including means for producing a first biasing signal at said output when said first input has a given voltage relationship to said second input;

a second branch circuit connecting said port with said base of said second transistor, said second branch circuit including a second operational amplifier having first and second inputs and an output, said second branch circuit further including means for connecting said first input of said second operational amplifier with said port, a second reference voltage connected with said second input of said second operational amplifier, and means for connecting said output of said second operational amplifier with said base of said second transistor; and said second operational amplifier including means for producing a second biasing signal at said output thereof when said first input thereof has a given relationship to said second input thereof.

30. The fail-safe control system of claim 29 further including first and second resistors, said first resistor connected between said first input of said first operational amplifier and a voltage source, said second resistor connected between said port and a voltage source.

31. The fail-safe control system of claim 29 further including first and second resistors, said first resistor connected between said first input of said first operational amplifier and a voltage source, said second resistor connected in parallel with said capacitor.

32. The fail-safe control system of claim 29 wherein said means for connecting said port with said first input of said second operational amplifier includes a second capacitor.

33. The fail-safe control system of claim 32 further including first, second and third resistors, said first resistor connected between said first input of said first operational amplifier and a voltage source, said second resistor connected between said port and a voltage source, said third resistor connected between said first input of said second operational amplifier and a voltage source.

* * * * *

UNITED STATES PATENT AND TRADEMARK OFFICE
CERTIFICATE OF CORRECTION

PATENT NO. : 5,175,413

DATED : December 29, 1992

INVENTOR(S) : Ronald W. Holling, Robert R. Williams and Bonifacio D. Malana

It is certified that error appears in the above-identified patent and that said Letters Patent is hereby corrected as shown below:

Column 1, line 40:

"functions other" should be --functions. Other--.

Column 7, line 59:
"op-amp" should be --operational amplifier--.

Column 8, line 9:

"op-amp" should be --operational amplifier--.

Column 9, line 39:

"with said" should be --with a--.

Signed and Sealed this

Fifteenth Day of March, 1994

Attest:

BRUCE LEHMAN

Attesting Officer        Commissioner of Patents and Trademarks